(12) United States Patent
Whitehead

(10) Patent No.: US 8,532,885 B1
(45) Date of Patent: Sep. 10, 2013

(54) AUTOMATIC GNSS SIGNAL ALLOCATION BETWEEN REMOTE AND BASE RECEIVERS

(75) Inventor: Michael L. Whitehead, Scottsdale, AZ (US)

(73) Assignee: Hemisphere GNSS Inc., Scottsdale, AZ (US)

( * ) Notice: Subject to any disclaimer, the term of this patent is extended or adjusted under 35 U.S.C. 154(b) by 0 days.

(21) Appl. No.: 13/439,373

(22) Filed: Apr. 4, 2012

(51) Int. Cl.
*G01C 21/28* (2006.01)

(52) U.S. Cl.
USPC .......................................................... 701/50

(58) Field of Classification Search
USPC .......................................................... 701/50
See application file for complete search history.

(56) References Cited

U.S. PATENT DOCUMENTS

| | | | |
|---|---|---|---|
| 6,397,147 B1 * | 5/2002 | Whitehead | 701/472 |
| 6,469,663 B1 * | 10/2002 | Whitehead et al. | 342/357.31 |
| 7,400,294 B2 * | 7/2008 | Whitehead et al. | 342/357.24 |
| 7,576,690 B2 * | 8/2009 | Vollath | 342/357.24 |
| 7,605,749 B2 * | 10/2009 | Lawrence | 342/357.42 |
| 7,696,922 B2 * | 4/2010 | Nicholson et al. | 342/357.58 |
| 7,746,272 B2 * | 6/2010 | Vollath | 342/357.27 |
| 7,755,542 B2 * | 7/2010 | Chen et al. | 342/357.24 |
| 7,800,530 B2 * | 9/2010 | Harper et al. | 342/357.67 |
| 7,847,728 B2 * | 12/2010 | Thomson et al. | 342/357.42 |
| 7,920,091 B2 * | 4/2011 | Thomson et al. | 342/357.42 |
| 8,044,853 B2 * | 10/2011 | Zhao et al. | 342/357.63 |
| 8,130,141 B2 * | 3/2012 | Pattabiraman et al. | 342/357.29 |
| 8,140,223 B2 * | 3/2012 | Whitehead et al. | 701/41 |
| 8,368,591 B2 * | 2/2013 | Talbot et al. | 342/357.27 |
| 2009/0164067 A1 * | 6/2009 | Whitehead et al. | 701/41 |

* cited by examiner

*Primary Examiner* — Thomas Tarcza
*Assistant Examiner* — Alex C Dunn
(74) *Attorney, Agent, or Firm* — Law Office of Mark Brown, LLC; Mark E. Brown; Christopher M. DeBacker

(57) ABSTRACT

A differential global navigation satellite system (DGNSS)-based guidance system which is capable of utilizing satellites from multiple GNSS networks, for example in a real time kinematic (RTK) system. The remote rover receiver and the base station transceiver periodically synchronize to ensure that the satellites being tracked by the rover receiver correspond with those tracked by the base station transceiver. This ensures that redundant position data is filtered out and an accurate GNSS position of the rover unit can be determined. The ability to use satellites from different GNSS networks increases the accuracy of the positioning system and increases the chance of multiple satellites being available to a receiver under a greater number of circumstances.

11 Claims, 3 Drawing Sheets

AUTOMATIC GNSS SIGNAL ALLOCATION BETWEEN REMOTE AND BASE RECEIVERS

BACKGROUND OF THE INVENTION

1. Field of the Invention

The present invention relates generally to vehicle guidance, and in particular to a system and method for global navigation satellite system (GNSS)-based positioning using a base station to provide differential GNSS (DGNSS) data for real time kinematic (RTK) vehicle guidance, wherein the base station communicates with the vehicle receiver and the vehicle receiver reallocates the satellites and the satellite systems it is tracking to match those tracked by the base station.

2. Description of the Related Art

GNSS guidance and control are widely used for vehicle and personal navigation and a variety of other uses involving precision location in geodesic reference systems. GNSS, which includes the Global Positioning System (GPS) and other satellite-based positioning systems, has progressed to sub-centimeter accuracy with known correction techniques, including a number of commercial satellite based augmentation systems (SBASs).

DGNSS uses a localized base receiver of known location in combination with a rover receiver on a moving vehicle for obtaining accurate vehicle positions from GNSS data. Differential positioning, using base and rover receivers, provides more accurate positioning information than standalone systems because the satellite ranging signal transmission errors tend to affect the base and rover receivers equally and therefore can be cancelled out in computing position solutions. In other words, the base-rover position signal "differential" accurately places the rover receiver "relative" to the base receiver. Because the "absolute" geo-reference location of the fixed-position base receiver is precisely known, the absolute position of the rover receiver can be computed using the known base receiver absolute position and the position of the rover receiver relative thereto.

For even more accurate information, higher frequency signals with shorter wavelengths are required. It is known in the art to use GNSS satellites' carrier phase transmissions and carrier phase signal components from base reference stations or SBAS satellites, including the Wide Area Augmentation System (WAAS, U.S.), and similar systems such as EGNOS (European Union) and MSAS (Japan). With such augmentation, a position may readily be determined to within millimeters. When accomplished with two antennas at a fixed spacing, an angular rotation may be computed using the position differences.

An example of a GNSS is the Global Positioning System (GPS) established by the United States government, which employs a constellation of 24 or more satellites in well-defined orbits at an altitude of approximately 26,500 km. These satellites continually transmit microwave L-band radio signals in two frequency bands, centered at 1575.42 MHz and 1227.6 MHz, denoted as L1 and L2 respectively. These signals include timing patterns relative to the satellite's onboard precision clock (which is kept synchronized by a ground station) as well as a navigation message giving the precise orbital positions of the satellites, an ionosphere model and other useful information. GPS receivers process the radio signals, computing ranges to the GPS satellites, and by triangulating these ranges, the GPS receiver determines its position and its internal clock error.

In standalone GPS systems that determine a receiver's antenna position coordinates without reference to a nearby reference receiver, the process of position determination is subject to errors from a number of sources. These include errors in the GPS satellite's clock reference, the location of the orbiting satellite, ionosphere induced propagation delay errors, and troposphere refraction errors.

To overcome these positioning errors of standalone GNSS systems, many positioning applications have made use of data from multiple GNSS receivers. Typically, in such applications, a reference or base receiver, located at a reference site having known coordinates, receives the GPS satellite signals simultaneously with the receipt of signals by a remote or rover receiver. Depending on the separation distance between the two GPS receivers, many of the errors mentioned above will affect the satellite signals equally for the two receivers. By taking the difference between signals received both at the reference site and the remote location, these errors are effectively eliminated. This facilitates an accurate determination of the remote receiver's coordinates relative to the reference receiver's coordinates.

The technique of differencing signals from two or more GPS receivers to improve accuracy is known as differential GPS (DGPS). Differential GPS is well known and exhibits many forms. In all forms of DGPS, the positions obtained by the end user's remote rover receiver are relative to the position(s) of the reference base receiver(s). GPS applications have been improved and enhanced by employing a broader array of satellites such as GNSS and WAAS. For example, see Whitehead et al. U.S. Pat. No. 6,469,663 for Method and System for GPS and WAAS Carrier Phase Measurements for Relative Positioning, which is assigned to a common assignee herewith and is incorporated herein by reference.

Although the above-mentioned GNSS networks such as EGNOS (European Union), MSAS (Japan), GPS (U.S.A.) and GLONASS (Russia) are available, traditional guidance systems are designed to function on only one of these GNSS systems at a time. This means that the potential to increase the positioning accuracy of a guidance system exists by allowing a guidance receiver to receive positional information from satellites belonging to more than one satellite network.

Heretofore there has not been available a DGNSS system and method for optimizing position information of a moving vehicle tracking multiple different GNSS networks using a single receiver unit.

SUMMARY OF THE INVENTION

In the practice of an aspect of the present invention, a vehicle is equipped with and guided by a typical GNSS guidance system capable of detecting satellites from multiple different GNSS guidance networks, determining redundant signals using a base station transceiver, and synchronizing which satellite networks are being used between the base station transceiver and the remote rover receiver. This process will correct irregularities caused by the rover receiver tracking different satellites from the base station receiver.

One of the main difficulties regarding GNSS position tracking is ensuring that enough satellites have a clear view of the rover receiver. If the rover receiver unit is obscured by buildings, trees, or the landscape, satellite signals cannot reach the receiver and less accurate position data results. By tracking satellites from more than one GNSS network, the present invention increases the probability that multiple satellites will be in clear view of the receiver and thus increases positional accuracy.

DETAILED DESCRIPTION OF THE PREFERRED EMBODIMENTS

I. Introduction and Environment

As required, detailed embodiments and aspects of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning. The invention can be fabricated in various sizes and configurations from a wide variety of suitable materials, which are chosen for their characteristics according to the intended use and the operation of the invention.

II. Preferred Embodiment Signal Allocation and Synchronization

A preferred embodiment of the present invention uses a GNSS guidance system 2 to track and process satellite signals from a plurality of available GNSS satellite networks. Some of these signals may be redundant with other signals from other networks and it would be advantageous to process only one of the other signals to free up processor functionality. Furthermore, channels may be limited and it is desirable to assign the limited available channels to signals that match those tracked by both the base station receiver and the remote rover receiver to obtain an RTK solution.

Figure 1:
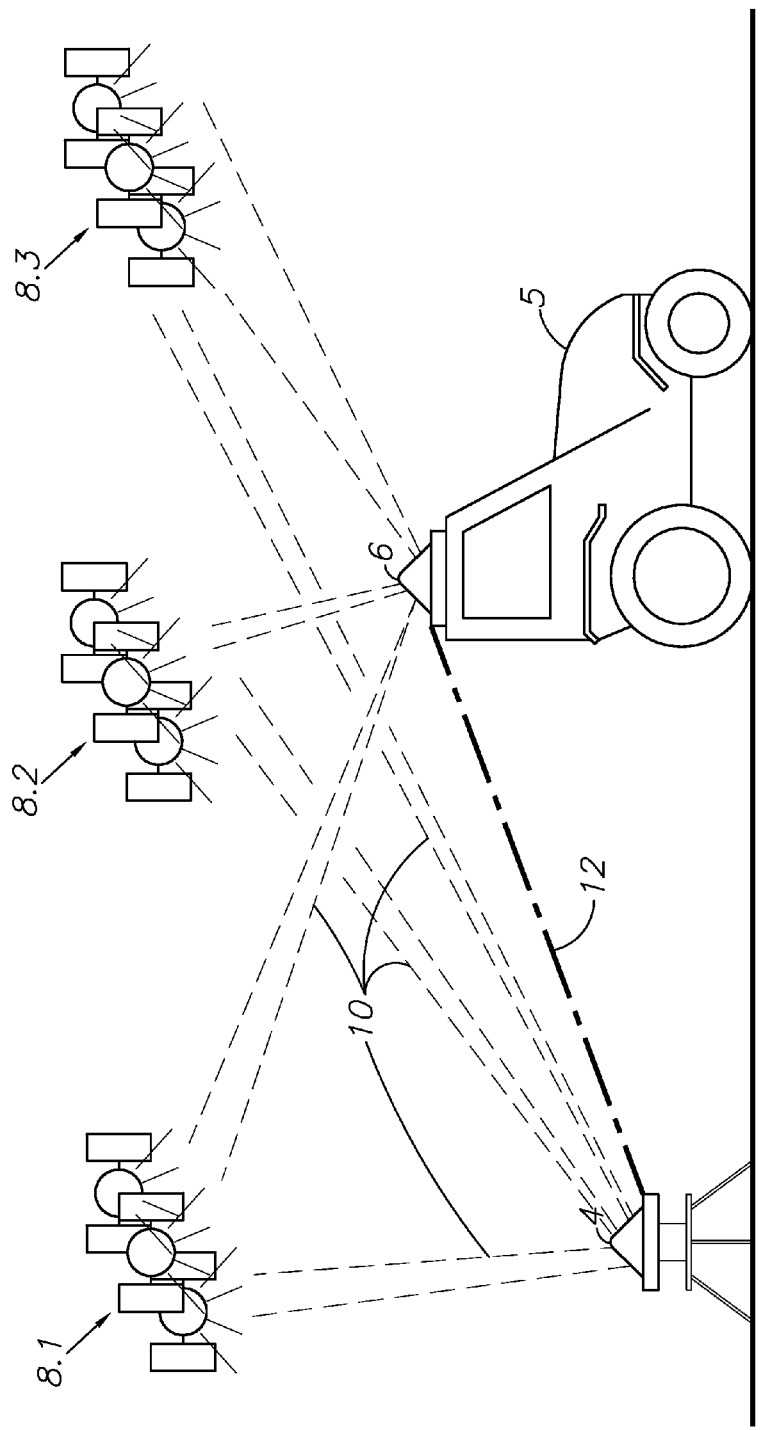
FIG. 1 is an elevation view of a DGNSS application of the present invention wherein multiple satellite networks are being tracked by a rover receiver and a base receiver, and the two receivers are synchronized.

Referring to the drawings in more detail, FIG. 1 shows the system 2 with a base station 4 and a vehicle 5, represented here by a tractor, with a remote rover antenna 6 and an attached receiver unit 14. Satellites from a number of GNSS networks 8.1, 8.2, 8.3 are shown sending out positional signals 10. These signals are being tracked by the rover antenna 6 and the base station 4. A synchronization signal 12 between the rover 6 and the base 4 enables DGNSS positional tracking of the vehicle 5, and also allows the rover receiver unit 14 and the base station 4 to synchronize the signals 10 to track.

Figure 2:
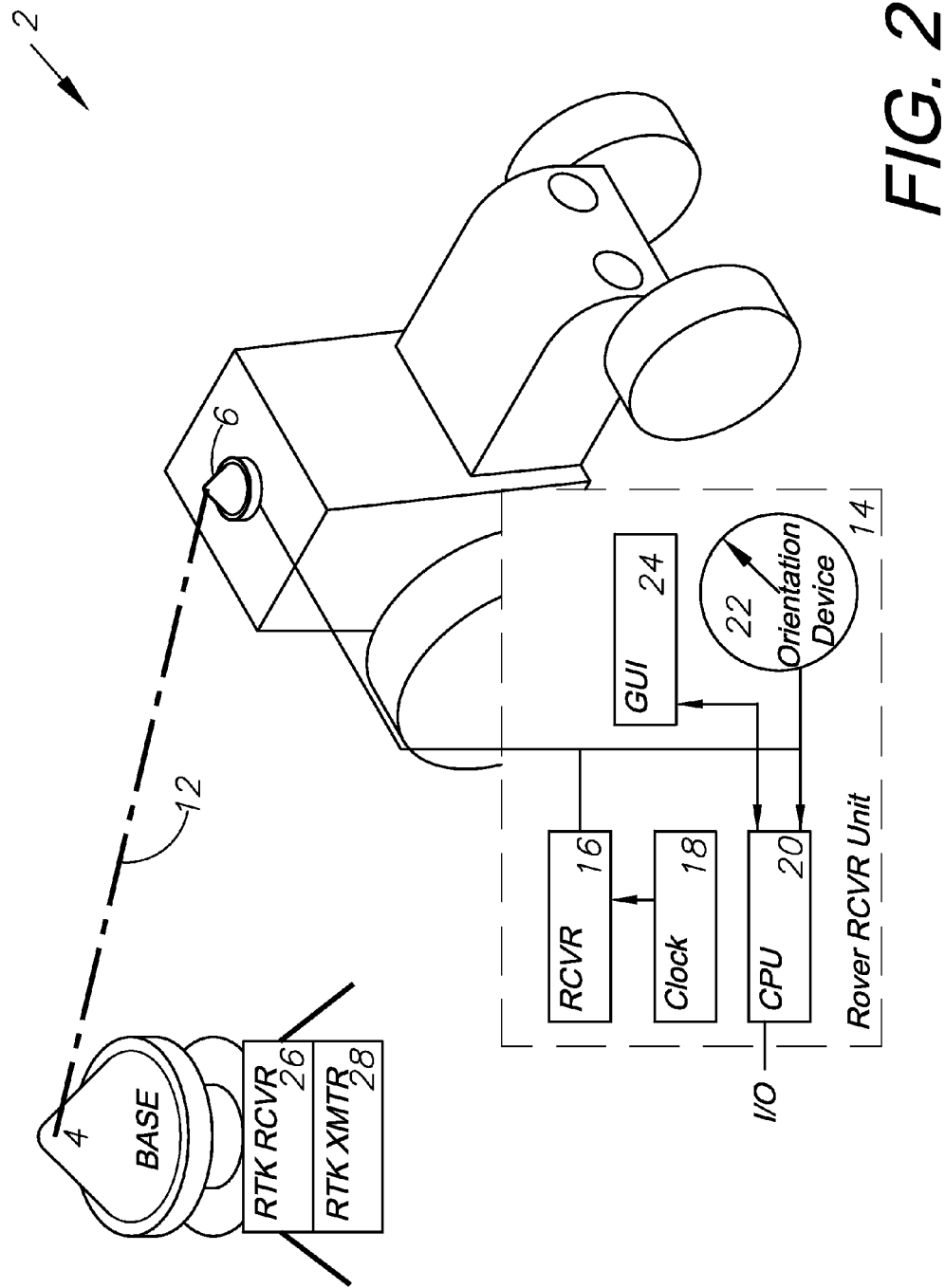
FIG. 2 is an isometric view of a vehicle containing the rover portion of the DGNSS system alongside a base station portion of the DGNSS system embodying an aspect of the invention.

FIG. 2 demonstrates the basic setup of the DGNSS antenna and receiver of the base station 4 and the vehicle 5. The vehicle 5 includes an antenna 6 and a remote rover receiver unit 14. The rover receiver unit 14 is further comprised of a GNSS receiver 16, a clock 18, and a central processing unit (CPU) 20 including an optional memory device, and an orientation device 22 such as a compass or inertial measurement unit (IMU). Also included is a graphical user interface (GUI) 24 which displays data reported by the CPU 20. It also allows the vehicle operator to input commands directly to the guidance system 2. The base 4 is further comprised of an RTK receiver 26 and an RTK transmitter 28 for communicating with the GNSS receiver 16.

The base station 4 transmits raw GNSS data, i.e. satellite ranging and timing signals, through the base signal 12 to the rover receiver unit 14. The rover receiver unit 14 computes differential corrections corresponding to the various satellite signals 10 that the base 4 is tracking. Initially, the signals 10 tracked by the base 4 may not coincide with the signals 10 tracked by the GNSS receiver 16. The present invention enables the GNSS receiver 16 to process both base and rover signals and to match its tracking and processing of satellite signals 10 to those satellites 8 and signals 10 received by and transmitted from the base 4. Although the base 4 could be configured and programmed to process the satellite signals 10 and transmit differential corrector terms, it is generally preferable for the base 4 to transmit raw signals received from the satellites 8 for processing by the rover receiver unit 14. Various types of rover receiver units with different differential correction technologies can thus be accommodated by common base receiver units covering specific geographical areas.

Initially, the GNSS receiver 16 tracks a default set of signals defined by the operator. The base 4 transmits raw satellite data signals 12. Upon receiving these signals from the base 4, the rover receiver unit 14 CPU 20 can make the determination which satellites 8 and signals 10 the base 4 is tracking and compute the differential corrections. Based upon this determination, the CPU 20 then reallocates its own tracking to include satellites 8 and signals 10 tracked by the base 4.

III. Signal Allocation Method

An example of the preferred embodiment method includes the tracking of SBAS satellites. For RTK techniques, the base 4 may track and provide data from satellites 8 from two or more different regional SBAS systems, but the rover receiver unit 14 may use only a limited number of SBAS channels. This limits the number of SBAS satellites 8 that need be tracked. The rover receiver unit 14 has no initial knowledge of which SBAS satellites 8 are tracked by the base 4 until their data 12 are received by the GNSS receiver 16. The satellite data received from the base 4 tell the CPU 20 which satellite signals 10 are being tracked by the base. The rover CPU 20 then reallocates its own SBAS channels to track the same satellites 8. The rover receiver unit 14 can then differentially correct and use the data from these SBAS satellites 8 in computing RTK solutions.

A second example is in the transition to modernized GPS, in particular the L2C signal. It is anticipated that in the near future there will be legacy base stations that make only L2(P/Y) observations, other base stations that make observations for both L2(P/Y) and L2C, and some base stations providing only for L2C observations as L2 is phased out. The rover receiver unit 14 initially will not know which signals, L2 or L2C, the base 4 is tracking The base 4 may be from a different manufacturer than the rover receiver unit 14 and the GNSS receiver 16. Upon receiving the satellite signal 12 from the base 4, the CPU 20 will know which signals are being used and will adjust satellite tracking accordingly and switch which signal type is being tracked, whether L2 or L2C. Typically, it is not desirable to use both L2C and L2 observations in the RTK solution since the use of both is redundant. The CPU 20 must choose the one that the base 4 is using to prevent these redundancies. This will allow the CPU 20 to free up processing power by ignoring redundant signals.

Figure 3:
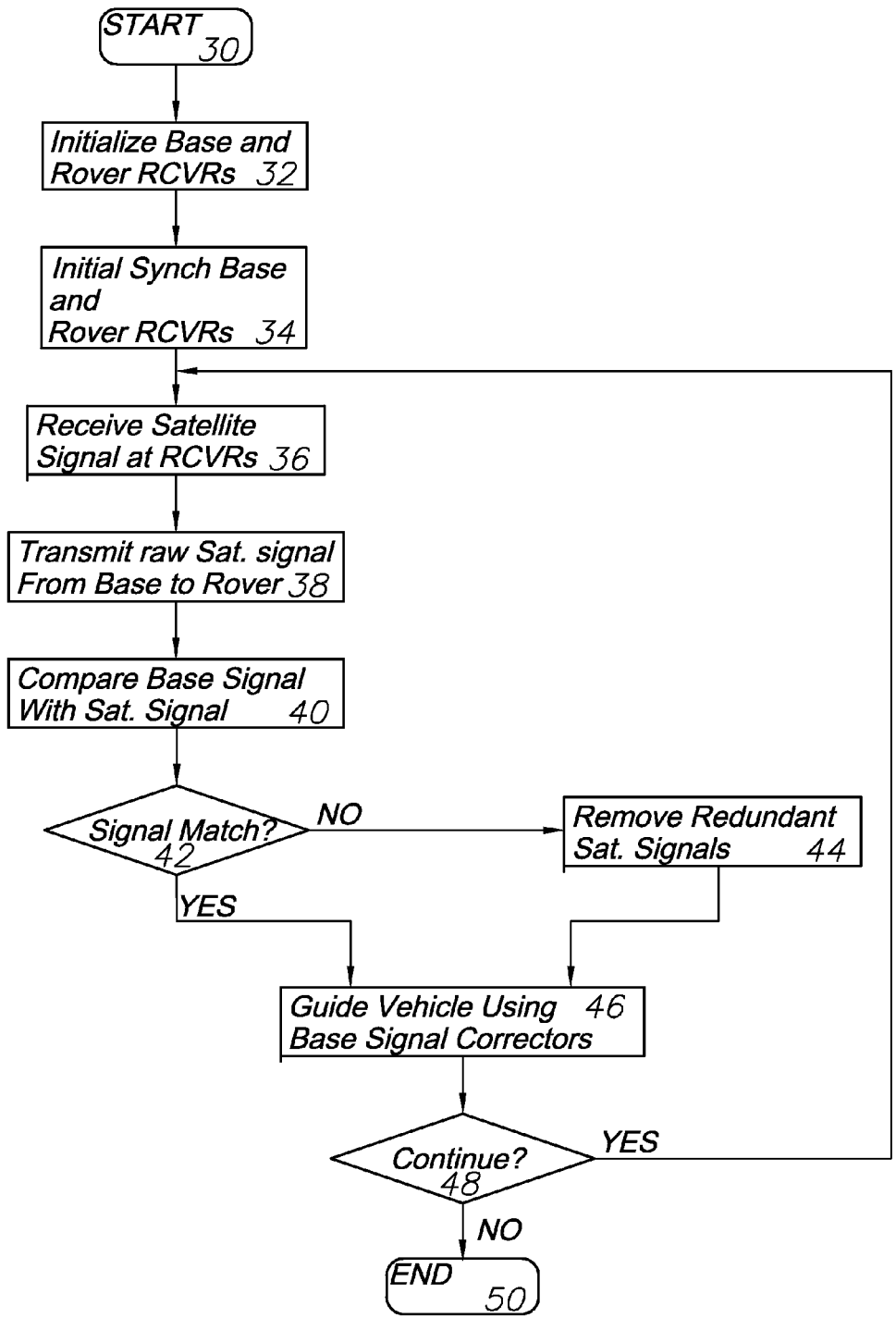
FIG. 3 is a flowchart showing a GNSS signal allocation method embodying an aspect of the present invention.

FIG. 3 provides a flow chart demonstrating the practice of a method of the present invention. The method begins at a start step 30. The base and rover receivers are initialized at 32, synchronized at 34, and begin receiving satellite position signals at 36. At this point, the GNSS receiver 16 and the base receiver (or transceiver) 26 may or may not be tracking the same satellites 8. The base transmitter sends raw satellite data signal to the rover receiver at 38. In a typical DGNSS guidance system, the GNSS receiver 16 would merely correct positional data received from the base transmitter 28. This is all that is necessary in a typical DGNSS system because only one satellite constellation transmitting one signal channel will be tracked by both the base receiver 26 and the GNSS receiver 16.

The present invention requires analysis in the rover receiver unit 14 of which satellites 8 are actually being tracked by the base station 4. The rover receiver processor 20 compares tracked satellite signals at 40. A determination is made at 42 whether the tracked satellite signals of the base receiver match those tracked by the rover receiver. If these signals do not match, the rover processor will remove redundant satellite signals it was originally tracking or otherwise switch to track the correct satellites at 44. This step is skipped if the comparison determines that the satellites tracked by the GNSS receiver 16 match those tracked by the base station receiver 26.

Finally, once the rover receiver and base station receiver are tracking the same satellites, the DGNSS guidance system will guide the vehicle attached to the rover receiver using base station signal correctors at 46. During guidance, a continuance check will be performed whether the system is on or off at 48. If the vehicle or guidance system is shut off, the method ends at 50. If the vehicle and guidance system continue to operate, the receivers continue to track satellite signals at 36, compare signals at 40, and guide the vehicle at 46.

IV. Conclusion

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. A guidance system including satellites from a plurality of global navigation satellite systems (GNSSs), a base station receiver and transmitter, and a rover receiver unit, the system further comprising:
   a vehicle;
   said rover receiver unit being comprised of a GNSS receiver, a clock, a CPU, an orientation device, and a graphical user interface (GUI) and adapted for interface with said vehicle;
   at least one GNSS antenna located on said vehicle and communicatively connected to said rover receiver unit;
   said rover receiver unit adapted for receiving position signal data from said plurality of GNSS satellites;
   said base station receiver adapted for receiving position signal data from said plurality of GNSS satellites;
   said base station transmitter adapted for transmitting raw satellite data signal to said rover receiver unit;
   wherein said CPU determines which satellite signals are being tracked by said base station receiver; and
   said CPU reallocates the GNSS satellite signals being tracked by said GNSS receiver.

2. The system of claim 1, wherein said vehicle is an agricultural vehicle receiving position signals to aid in the guidance of the vehicle in a field.

3. The system of claim 1, further comprising:
   the plurality of GNSS satellite signals including redundant signals; and
   the CPU reallocating the GNSS satellite signals being tracked by said GNSS receiver to remove said redundant signals and include only those signals tracked by the base receiver.

4. The system of claim 3, wherein the redundant signals include L2(P/Y) satellite signals and L2C satellite signals.

5. The system of claim 1, wherein the CPU reallocates the GNSS satellite signals being tracked by said GNSS receiver based upon the differential correction data signal supplied by the base station transmitter.

6. A method of vehicle guidance with a vehicle guidance system, the guidance system including satellites from a plurality of global navigation satellite systems (GNSS), a base station receiver and transmitter, a vehicle, and a rover receiver unit, the method comprising the steps:
   receiving GNSS satellite position signals with the base station receiver and the rover receiver unit;
   tracking GNSS satellites based upon said received GNSS satellite signals;
   transmitting raw satellite data signal with the base station transmitter;
   receiving base station differential correction data with said rover receiver unit; and
   reallocating the GNSS satellites being tracked by the rover receiver unit to match those tracked by said base station receiver.

7. The method of claim 6, wherein said rover receiver unit is comprised of a GNSS receiver, a clock, a CPU, an orientation device, and a graphical user interface (GUI).

8. The method of claim 6, wherein said vehicle is an agricultural vehicle receiving position signals to aid in the guidance of the vehicle in a field.

9. The method of claim 6, wherein the plurality of GNSS satellites produce redundant signals, the method further comprising the step:
   reallocating the GNSS satellite signals being tracked by said GNSS receiver to remove said redundant signals and include only those signals tracked by the base receiver.

10. The method of claim 9, wherein the redundant signals include L2(P/Y) satellite signals and L2C satellite signals.

11. The method of claim 6, including the step:
    reallocating the GNSS satellite signals being tracked by the rover receiver unit based upon the differential correction data signal supplied by the base station transmitter.

* * * * *